United States Patent
Hellwege

(10) Patent No.: US 9,122,417 B1
(45) Date of Patent: Sep. 1, 2015

(54) NETWORK ATTACHED STORAGE (NAS) PROTECTION METER AND METHODS FOR ALERTING USERS OF THE STATE OF PROTECTION OF A NAS

(75) Inventor: Stephen A. Hellwege, Ladera Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 166 days.

(21) Appl. No.: 13/367,273

(22) Filed: Feb. 6, 2012

(51) Int. Cl.
G06F 3/06 (2006.01)
G06F 11/32 (2006.01)
G06F 11/30 (2006.01)
G06F 11/07 (2006.01)

(52) U.S. Cl.
CPC .............. *G06F 3/067* (2013.01); *G06F 3/0604* (2013.01); *G06F 3/0605* (2013.01); *G06F 11/0727* (2013.01); *G06F 11/3034* (2013.01); *G06F 3/0629* (2013.01); *G06F 3/0689* (2013.01)

(58) Field of Classification Search
CPC ...... G06F 3/0689; G06F 3/067; G06F 3/0605
USPC ......................................................... 711/114
See application file for complete search history.

(56) References Cited

U.S. PATENT DOCUMENTS

| | | | |
|---|---|---|---|
| 8,316,263 B1 * | 11/2012 | Gough et al. | 714/47.3 |
| 2008/0177971 A1 * | 7/2008 | Prahlad et al. | 711/170 |
| 2008/0256386 A1 * | 10/2008 | Boerger et al. | 714/6 |
| 2010/0223373 A1 | 9/2010 | Littlefield et al. | |
| 2010/0306434 A1 * | 12/2010 | Dube et al. | 710/300 |
| 2010/0321183 A1 * | 12/2010 | Donovan et al. | 340/540 |
| 2011/0035419 A1 | 2/2011 | Littlefield et al. | |
| 2011/0035621 A1 | 2/2011 | Littlefield et al. | |
| 2011/0113194 A1 * | 5/2011 | Terry et al. | 711/114 |

* cited by examiner

*Primary Examiner* — Charles Rones
*Assistant Examiner* — Andrew Russell

(57) ABSTRACT

A network attached storage device may include at least one storage device, a network connection coupling the at least one storage device to a network and a processor coupled to the at least one storage device and to the network connection. The processor may be configured to monitor a plurality of operating parameters of the network attached storage; determine a state of a network attached storage based on at least two of the monitored plurality of operating parameters of the network attached storage; determine a current level of protection from among a predetermined plurality of levels of protection based on the determined state of the network attached storage, and provide an indication of the determined level of protection afforded by the network attached storage.

23 Claims, 6 Drawing Sheets

NETWORK ATTACHED STORAGE (NAS) PROTECTION METER AND METHODS FOR ALERTING USERS OF THE STATE OF PROTECTION OF A NAS

BACKGROUND

Conventional network attached storage (NAS) devices often provide rudimentary indicators (such as LED lights) that provide some indication of, for example, power, drive activity, network connectivity, and the like. However, such known NAS devices do not provide useful information regarding what the user really cares about; namely, the current level of protection or redundancy of the user's data based on the state of the NAS device and its connectivity. With the ever-increasing capacity and complexity of NAS devices and of other backup options, it is likely to become increasingly difficult for (especially non-technically-inclined) users to be able to discern the true operational status of their NAS device and of the data stored therein. Indeed, most users will likely wait until the NAS device fails before realizing that their data is in jeopardy or has been compromised. What are needed, therefore, are NAS devices, NAS-containing systems and methods that do not suffer from the above-detailed disadvantages.

DETAILED DESCRIPTION

One embodiment is a network attached storage (NAS) device configured to indicate a current level of protection provided by the NAS device. Various protection meters and notifications allow users to easily intuitively ascertain the state of their NAS device and the level of protection of their data afforded by the NAS device and to evaluate whether further action is required. The protection meters may be implemented as a set of indicator lights arranged in a visually prominent shape, and/or as graphics such as a bar graph, circular gauge, triangular gauge, and the like. Such protection meters and/or notifications may be provided on the NAS device itself and/or remotely from the NAS device, such as on a Web browser or another network-connected device. The NAS device may be configured to monitor various operating parameters indicative of the current operating state of the NAS and use such monitored parameters to determine the current state of the NAS device and the current level of protection of the user's data.

The NAS device may be provided with various sensors configured to monitor the current state of a plurality of operating parameters of the NAS device. Such sensors may be configured to report the monitored parameters or may be configured to be polled or otherwise queried to provide the current state of the monitored NAS device operating parameters. A processor on the NAS device may be configured to periodically (e.g., at regular intervals, or asynchronously) acquire and store the values of the monitored operating parameters and act upon the stored values.

Figure 1:
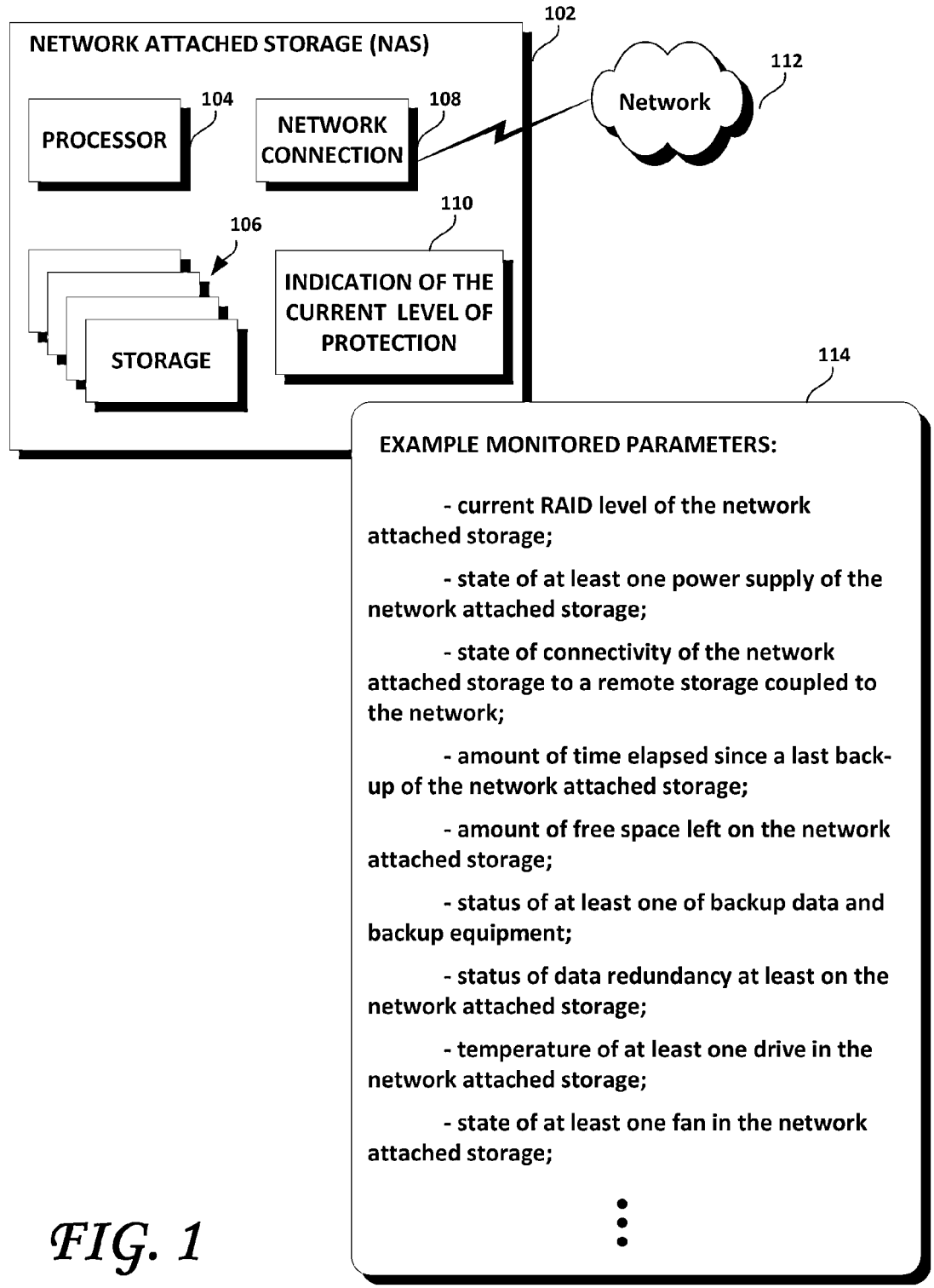
FIG. 1 is a block diagram of a network attached storage device and example monitored parameters, according to one embodiment.

FIG. 1 is a block diagram of a network attached storage device and example monitored parameters, according to one embodiment. As shown therein, a NAS device 102 may include one or more storage devices 106, a network connection 108 coupling the NAS device 102 to a network 112 and a processor 104. The processor 104 may be coupled to the storage device(s) 106 and to the network connection 108. According to one embodiment, the processor 104 may be configured to indicate a current level of protection provided by the NAS device 102. Indeed, the processor 104 may be configured to monitor a plurality of operating parameters 114 of the NAS device 102 and to determine the state of a NAS device 102 based on at least two of the monitored plurality of operating parameters 114. Based on the determined state of the NAS device 102, the processor 104 may determine, as shown at 110, a current level of protection from among a predetermined plurality of levels of protection. This determined current level of protection may then be provided to, for example, a user of the NAS device 102, thereby giving the user with a simple and intuitive indication of how safe his or her data is, and/or the current health of the NAS device 104. The level of protection may be determined dynamically, and may change in response to changes in the values of the monitored operating parameters 114 of the NAS device 102. For instance, if the user adds an additional drive or changes RAID levels within the NAS device 102, the protection level may be updated accordingly.

A non-exhaustive listing of exemplary operating parameters that may be monitored is shown at reference numeral 114 in FIG. 1. Such monitored operating parameters of the NAS device 102 may include, for example:
  RAID level;
  Power level;
  State of power supply or power supplies;
  Status of network connectivity;
  Status of connectivity to a remote backup or share drive;
  Number of drives that are operational;
  Time elapsed since last backup;
  Status of backup data and/or backup equipment;
  Amount of free-space left on the NAS device
  Status of data redundancy;
  Status of NAS components, such as power supply, fans, drive temperature, and the like.

It is to be noted that the above list is merely indicative of the wide range of NAS device operating parameters that may be monitored, logged and stored, and is not intended to be an exclusive listing thereof.

According to one embodiment, values of each of the logged and stored NAS device operating parameters 114 may be compared against one or more look-up tables of values for each or some of the monitored operating parameters 114 and a numerical score may be assigned based upon the correspondence between the stored operating parameter 114 and the corresponding value stored in the look-up table(s). These numerical values may be simply summed, resulting in an aggregate score that is indicative of the current state of the NAS device 102. For example, the operating parameter "Drive Temperature" may be assigned a value of zero if the temperature of the NAS device 102 is less than 80 degrees Fahrenheit, a value of one if the temperature is between 81 and 90 degrees and a value of three if the temperature is greater than 90 degrees. Similarly, the value of the "Time Since Last Backup" operating parameter may be assigned a value of zero if the last backup occurred less than 12 hours ago, a value of one if the last backup occurred between 12 and 24 hours ago and a value of three if the last backup occurred more than 24 hours ago. The values of these and other operating parameters may be summed to generate an aggregate score. Alternatively, a more complex formula may be employed for determining the aggregate score indicative of the current state of the NAS device 102, as those of skill in this art will readily recognize. It is also recognized that some parameters may be interpreted as having relatively more importance than other operating parameters of the NAS device. Therefore, each of the monitored operating parameters of the NAS device 102 may be assigned a weighting factor reflecting such relative importance. The weighting factor for one or more of the monitored operating parameters may be set to unity, while others may be set to a smaller or greater value. The logic that determines the protection level may then take these weighting factors into account when calculating or determining the level of protection to report to the user. According to one embodiment, the look-up tables may be omitted, and the formula, algorithm or heuristic employed by the logic may use the raw values of some or all of the monitored operating parameters of the NAS device 102 in its determination of the level of protection. Other methods of calculating or otherwise determining the level of protection of the user's data and/or the NAS device 102 may be developed and employed.

According to one embodiment, the processor 104 may be further configured to calculate an estimated mean time-to-recovery (MTTR) as part of the algorithm to determine the protection level. The MTTR value may also be reported or otherwise provided to the user along with (or separately from) the protection level.

However determined from the monitored operating parameters, the current state of protection of the user's data and/or the status of the NAS device 102 may be reported to the user as a specific level of protection selected or determined from among a plurality of such levels of protection. The levels of protection may generally correspond to the relative levels of safety of the user's data and/or the "health" of the NAS device 102, from a low level of protection and/or state of the NAS device 102 in which the user's data is or may be at risk of being compromised and/or in which the NAS device 102 (or constituent components thereof) is/are at risk of imminent failure, to a high level of protection and/or state of the NAS device 102 in which the user's data and/or the NAS device 102 is at its highest level of redundancy and/or security and in which the NAS device 102 is working at specification. According to one embodiment, the analysis of the logged and stored current operating parameters of the NAS device 102 may be resolved into one of five levels of protection. Five levels of protection may enable a sufficient level of granularity to convey useful information to the user without, however, under-reporting the state of the data and/or NAS device 102 or over-taxing the user's ability to readily grasp and act upon the provided information. However, it is to be understood that a lesser (e.g., 3) or a greater number (e.g., 8 or more) of levels of protection may be used, depending upon the complexity of the algorithm, the number of logged and stored current operating parameters and/or the sophistication of the target users, among possible factors.

The levels of protection may be communicated to the user in various ways, such as audible alerts, visual indicators, colors, electronic messaging and the like. For example, the NAS device 102 may be configured to message an electronic device coupled to the network 112 via, for example, a web browser, a popup window, an email or a text message, to identify but a few possibilities. More than one messaging modality may be used, and the messages may be selectively more or less persistent and/or intrusive, depending upon the user's preferences and/or depending upon the determined level of protection. That is, an alert or message indicative of a low level of protection or indicative of an imminent risk of data loss of NAS device failure may be communicated to the user via more than one messaging modality and may be repeated until appropriate remedial action is taken by the user or the alert and/or message is silenced by an affirmative action of the user.

As noted above, a spectrum comprising five discrete levels of protection may be effective to accurately communicate the state of protection of the user's data and/or the state of the NAS device 102. For example, the five levels of protection may be loosely defined as follows:

Level 5: The user's data and the NAS device are determined (through analysis of the logged and stored current NAS device operating parameters) to be at their highest level of protection and operating condition possible. Recovery from a single failure could be performed virtually in real-time without disrupting performance. For example, the user's data having both local and remote redundancy active and a NAS device operating nominally may be determined to be operating at Level 5.

Level 4: The user's data is determined (through analysis of the logged and stored current NAS device operating parameters) to be at a high level of protection and the NAS device is operating at near-specification. The NAS device may have suffered a "minor" event such as, for example, slow network connectivity or a long time has elapsed since a last successful remote backup, and the like. In contrast to level 5, recovery from another failure may require a longer time, such as 1-4 hours (the estimated MTTR).

Level 3: The user's data and the NAS device are determined (through analysis of the logged and stored current NAS device operating parameters) to be at a medium level of protection. To be assigned this level of protection, the NAS device may have suffered a more serious event, such as a drive failure or a recent power disruption recently, for example. In contrast to level 4, the MTTR from another failure may require a significant amount of time increases significantly, to 8-12 hours, for example.

Level 2: The user's data and/or the NAS device are determined (through analysis of the logged and stored current NAS device operating parameters) to be at a low level of protection. The NAS device may have suffered a serious casualty, such as power loss and may be operating on battery backup, the drives may have a low amount of free space available, the NAS device may be operating at a high drive temperature, or similar serious occurrence. In contrast to level 3, another failure may cause data loss or corruption and/or recovery may require more than 12 hours (for example).

Level 1: The user's data has or is in imminent danger of corruption and/or the NAS device is in imminent danger of failure. The NAS device may have suffered multiple casualties that are serious or that cumulatively endanger the NAS device and/or the user's data. In contrast to level 2, immediate shutdown of the NAS device is recommended.

Figure 2:
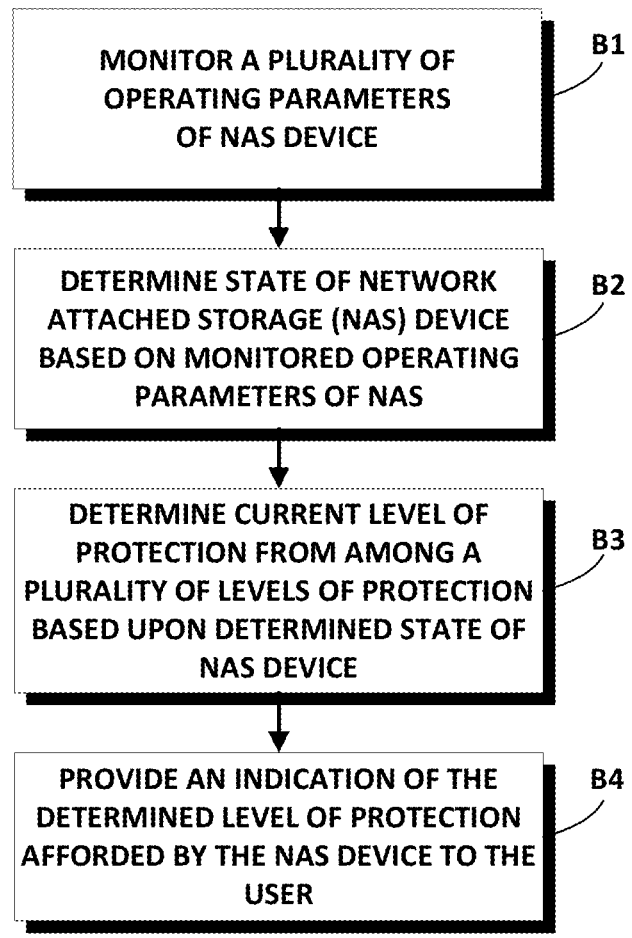
FIG. 2 is a flowchart of a method of indicating a current level of protection provided by a network attached storage, according to one embodiment.

FIG. 2 is a flowchart of a method of indicating a current level of protection provided by a network attached storage, according to one embodiment. As shown therein, block B1 calls for monitoring a plurality of operating parameters of the NAS device 102 including, for example, one or more of the exemplary operating parameters listed above. Block B2 calls for a determination of the state of the network attached storage device (and consequently of its stored data) based on the monitored operating parameters of the NAS device 102. The state of the NAS device 102 may be determined through an analysis of and/or calculation using one or more available and optionally weighted NAS device operating parameters. The current level of protection of the NAS device 102 and of its store data may then be determined from among a predetermined plurality protection levels based upon the analyzed or calculated state of the NAS device 102. For example, the state of the NAS device 102, which may be embodied in a numerical score, may be compared to each of, for example, five threshold values, each threshold value corresponding to one of the five levels of protection. For example, if the calculated score corresponding to the state of the NAS device 102 is equal or greater than the threshold value for protection level 5, the current level of protection of the NAS device may be determined, in block B3, as protection level 5. Lastly, block B4 calls for the provision of an indication of the determined level of protection of the NAS device and of its stored user data to the user.

Figure 3:
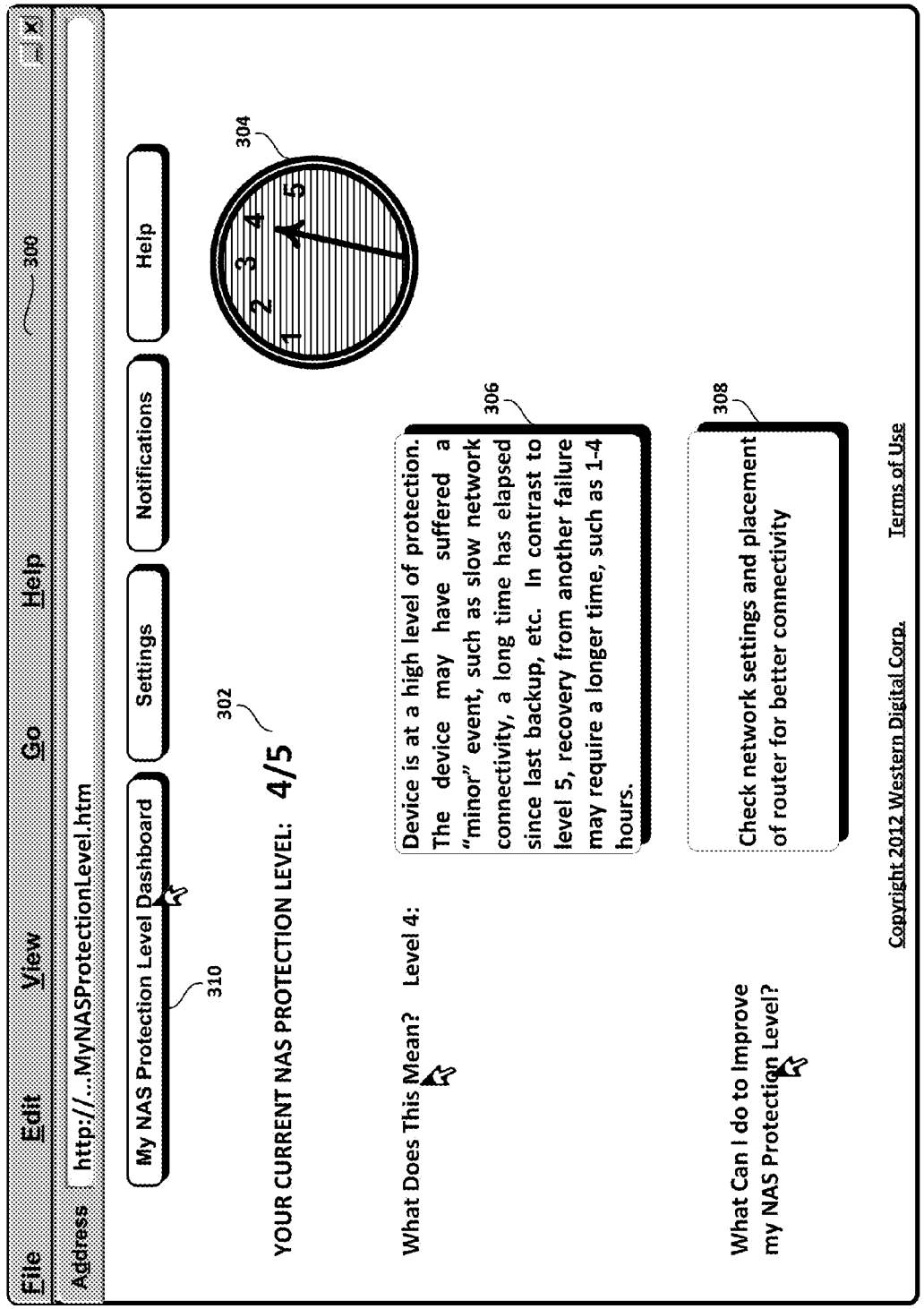
FIG. 3 is an example user interface configured to show a current level of protection provided by a network attached storage, according to one embodiment.

The provision of the indication of the determined level of protection may be communicated to the user in various ways. FIG. 3 is an example user interface configured to show a current level of protection provided by a network attached storage, according to one embodiment. Such user interface may be embodied as a web browser, but may also take the form of a mobile app or other dedicated software. FIG. 3 shows a browser 300 configured as a "Dashboard" (selected by the user through tab 310), in which the level of protection may be displayed simply, via a text-based message such as shown at 302 and/or a graphic, such as shown at 304. The graphic 304 displayed within the browser, app or other software, may take the form of a gauge (as shown), a series of five (for example) indicators, a numerical display, or most any other graphic, text-based or hybrid visual indicator of the determined level of protection. An audible indication of the current level of protection may also be generated, especially if the level of protection is determined to be low, meaning that either the NAS device 102 or the contained data is at risk of failure, corruption or loss of integrity.

As also shown in FIG. 3, the browser, app or other software, displayed by an accessing host device or other network-connected device, may also display an explanation of the different levels of protection, as shown at 306, as well as suggestions 308 on how to improve the level of protection afforded by the NAS device 102. As shown, the graphic 304 provides the user with an intuitive and immediate understanding of the current level of protection afforded by his or her NAS device.

Figure 4:
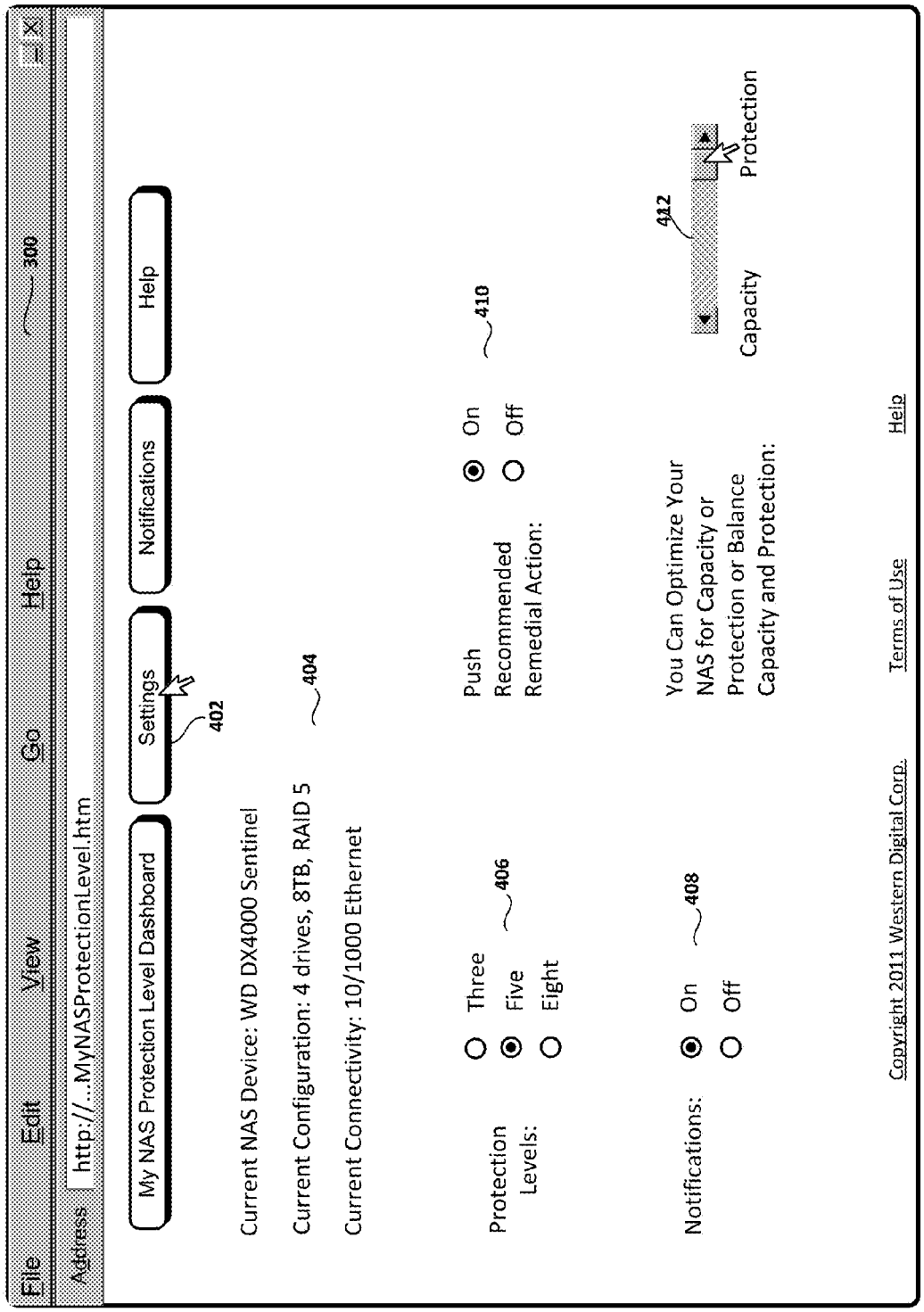
FIG. 4 is an example user interface configured to show exemplary user-configurable settings, according to one embodiment.

FIG. 4 is an example user interface configured to show exemplary user-configurable settings, according to one embodiment. In FIG. 4, the user has clicked or otherwise selected the "Settings" tab 402. As shown, selection of the Settings tab 402 may cause the browser, app or other rendering software to display characteristics of the NAS device 102, as collectively shown at 404. At 406, the user may be enabled to select a preferred number of protection levels that will be reported. Indeed, the user may be provided with the ability to select from among, for example, three choices of three, five and eight levels of protection. Here, it can be seen that the user has selected that the granularity of the protections levels be limited to five, consistent with the example shown and described herein. The user may also be provided with the ability to turn notifications on and off, as shown at 408. Other customizations may be possible, such as shown at 410, in which the user may opt to have recommended remedial actions (in case the determined level of protection is less than the highest possible level) pushed to a designated device or location. Such recommendations may include, in addition to that shown at 308 in FIG. 3, purchasing additional drives, changing RAID levels, selecting another remote backup location, for example.

Other possibilities include a more active management of the NAS device 102, such as providing the user with the ability to optimize his or her NAS device 102 for capacity or protection level as shown at 412, for example. Such choice may affect the RAID level of the drive and may also affect the provided and reported level of protection. Those of skill in this art may recognize that the functionalities shown and described herein are given for exemplary purposes only, and are not intended to limit the scope of the embodiments shown and described herein.

Figure 5:
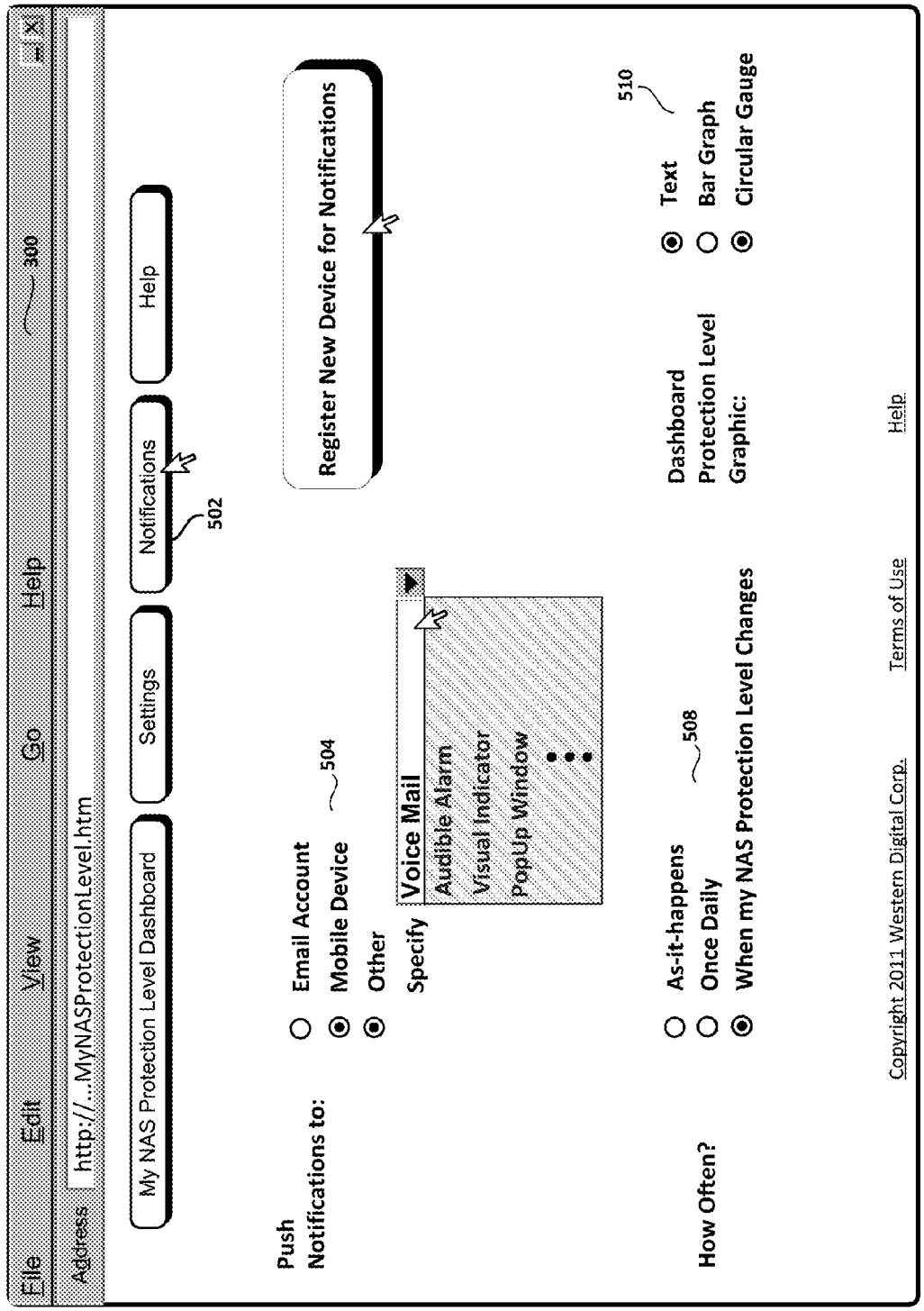
FIG. 5 is an example user interface configured to show exemplary user-configurable notification settings, according to one embodiment.

FIG. 5 is an example user interface configured to show exemplary user-configurable notification settings, according to one embodiment. In FIG. 5, the user has clicked or otherwise selected the "Notifications" tab 502, which enables the manner in which the user is notified of changes in the determined level of protection to be changed and personalized at will. As shown therein, the user may be given the ability to select how the level of protection of the NAS device 102 is communicated to the user. For example, the determined level of protection may, as shown at 504, be communicated to the user via email to a specified email account, to a mobile device (via a text message or some other form of electronic message), and/or via other modalities such as an audible alarm (generated locally at the NAS device and/or at the accessing network-connected device), via a visual indicator (on the NAS device, for example) or via a pop-up window on the user's network-connected device, for example. The persistence of the notifications may also be selected by the user. For example, the NAS device 102 may be configured to repeatedly notify the user until the user takes appropriate remedial action. The frequency of such notifications may also be selected by the user, as shown at 508. As shown at 510, the user may select the style of the notification displayed on the "Dashboard" depicted in FIG. 3. In this case, the user has selected notifications of the determined level of protection to be sent to his or her mobile device and to his or her a voicemail as shown at 504 when the NAS protection level changes as shown at 508, and as text and a circular gauge in the Dashboard, as shown at 510.

Figure 6:
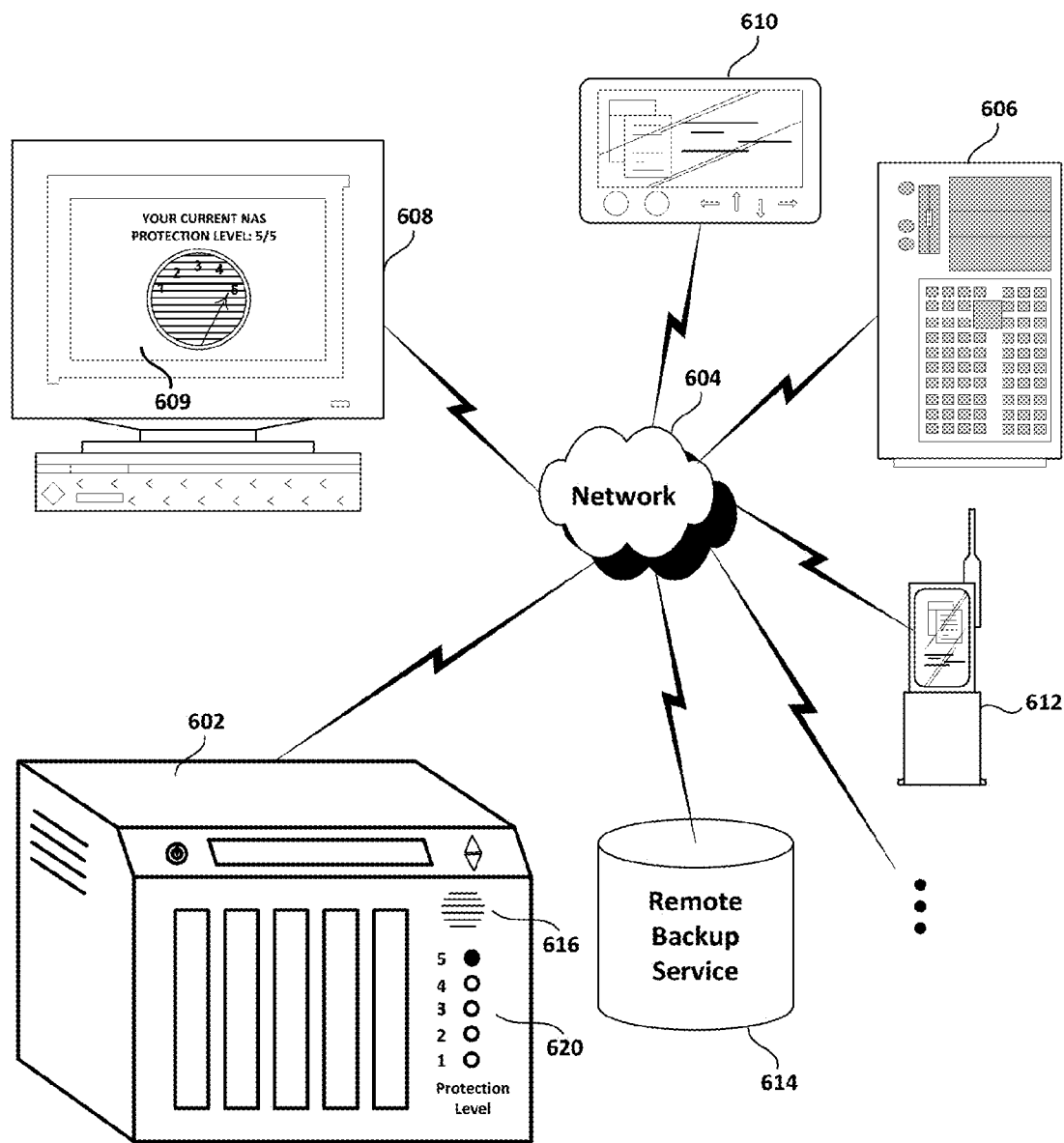
FIG. 6 shows a network attached storage device, a network and other network-accessing devices, according to one embodiment.

FIG. 6 shows a network attached storage device, a network and other network-accessing devices, according to one embodiment. As shown therein, a NAS device 602 is coupled to a network 604. The functionality described and shown herein may reside on the NAS device 602 and/or on another network connected device, such as server 606 or other network-connected accessing device, for example. The notifications including, for example, the indication of the determined current level of protection afforded by the network attached storage, may be provided to the user via, for example, a client network connected computer 608 (via a notification 609, for example) and/or a tablet computer 610 or other mobile device such as, for example, a mobile phone, as shown at 612.

Not only may the user be notified upon, for example, a change in the protection level afforded the user's data by the NAS device 602, but selected third parties may be so notified as well. For example, third parties, such as a remote backup service 614, may also be notified based on the protection level and/or changes thereto. Notifications to the user and/or third parties may be triggered based upon downgrade to any of the protection levels, a downgrade of multiple protection levels, periodically and/or upon the occurrence of a predetermined event, for example. As described earlier, some of the notifications may be generated locally, on and by the NAS device 602. For example, an audio alarm (e.g., a tone, an alarm sequence or spoken word) notification or alert may be generated and sent to a speaker or other sound emitting component of the NAS device, as shown at 616. Alternatively or in addition, a visual indication of the currently determined level of protection may be provided by the NAS device 602 in the form of, for example, luminous indicators 620. As those of skill in this art will recognize, the luminous indicators may shine in different colors or intensities, and may selectively blink insistently to attract the user's attention.

The structures and functionality shown and described herein may provide the user (especially a non-technical user) with the ability to easily evaluate and diagnose the state of their NAS device. Moreover, the structures and functionality shown and described herein may also serve a loss-preventative function, alerting the user when further action or maintenance is required or otherwise recommended, thus reducing the chances of lost data or failure by the NAS device.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. Those skilled in the art will appreciate that in various embodiments, the actual structures or functionalities shown and described herein may differ from those shown in the figures. For example, the form, content and delivery method of the notifications may differ from that shown and described herein. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A network attached storage (NAS), comprising:
   at least one storage device;
   a network connection coupling the at least one storage device to a network; and
   a processor coupled to the at least one storage device and to the network connection, the processor being configured to:
   adjust a granularity of protection levels for the at least one storage device based on user input, wherein different granularities comprise a different number of protection levels and wherein different granularities are associated with different combinations of operating parameters;
   receive a selection from the user of a manner in which a current protection level of the protection levels of the at least one storage device is to be provided and communicated to the user;
   monitor a plurality of operating parameters of the network attached storage, at least one of the monitored parameters being unrelated to data or to an amount of storage space remaining on the network attached storage;
   determine a state of a network attached storage based on at least two of the monitored plurality of operating parameters of the network attached storage, at least one of the two monitored plurality of operating parameters being unrelated to the amount of storage space remaining on the network attached storage;
   determine the current protection level based on the determined state of the network attached storage; and
   provide to the user an indication of the determined protection level afforded by the network attached storage according to the received selection.

2. The network attached storage of claim 1, wherein the monitored plurality of operating parameters comprises at least one of a parameter indicative of a current RAID level of the network attached storage, a parameter indicative of a state of at least one power supply of the network attached storage, and a parameter indicative of a state of connectivity of the network attached storage to a remote storage coupled to the network.

3. The network attached storage of claim 1, wherein the monitored plurality of operating parameters comprises at least one of a parameter indicative of an amount of time elapsed since a last back-up of the network attached storage, a parameter indicative of an amount of free space left on the network attached storage, and a parameter indicative of a status of at least one of backup data and backup equipment.

4. The network attached storage of claim 1, wherein the monitored plurality of operating parameters comprises at least one parameter indicative of a status of data redundancy at least on the network attached storage, a parameter indicative of a temperature of at least one drive in the network attached storage, and a parameter indicative of a state of at least one fan in the network attached storage.

5. The network attached storage of claim 1, wherein the indication comprises a number of a protection level, from among the predetermined protection levels, that is indicative of the determined protection level.

6. The network attached storage of claim 1, wherein the processor is further configured to generate and send an alert configured according to the received selection at least when the current protection level is downgraded to a lower protection level.

7. The network attached storage of claim 6, wherein the processor is further configured to generate and send, according to the received selection, at least one of:
   an electronic message related to a current protection level to a device coupled to the network;
   an audible message related to a current protection level, and
   a window related to a current protection level on a display of a computer coupled to the network.

8. The network attached storage of claim 1, wherein the processor is further configured to determine a current protection level based on a weighting factor associated with at least one of the monitored plurality of operating parameters.

9. The network attached storage of claim 1, wherein the processor is further configured to assign a numerical score to the determined state of the network attached storage and determine the current protection level afforded by the network attached storage depending upon the assigned numerical score.

10. The network attached storage of claim 1, wherein the processor is further configured to enable user selection of a number of protection levels and determine the current protection level is within the selected number of protection levels.

11. The network attached storage of claim 1, wherein the processor is further configured to monitor the plurality of operating parameters of the network attached storage by polling at least one of:
   the at least one storage device;
   the network connection, and
   a remote storage coupled to the network.

12. A computer-implemented method of indicating a current level of protection provided by a network attached storage, the method comprising:
   adjusting a granularity of protection levels for at least one storage device based on user input, wherein different granularities comprise a different number of protection levels and wherein different granularities are associated with different combinations of operating parameters;
   receiving a selection from the user of a manner in which a current protection level of the protection levels of the at least one storage device is to be provided and communicated to the user;
   monitoring a plurality of operating parameters of the network attached storage, at least one of the monitored parameters being unrelated to data or to an amount of storage space remaining on the network attached storage;
   determining a state of a network attached storage based on at least two of the monitored plurality of operating parameters of the network attached storage, at least one of the two monitored plurality of operating parameters being unrelated to the amount of storage space remaining on the network attached storage;
   determining the current protection level afforded by the network attached storage based on the determined state of the network attached storage; and
   providing to the user an indication of the determined current protection level afforded by the network attached storage according to the received selection.

13. The computer-implemented method of claim 12, wherein the monitored plurality of operating parameters comprises at least one of a parameter indicative of a current RAID level of the network attached storage, a parameter indicative of a state of at least one power supply of the network attached storage, and a parameter indicative of a state of connectivity of the network attached storage to a remote storage.

14. The computer-implemented method of claim 12, wherein the monitored plurality of operating parameters comprises at least one of a parameter indicative of an amount of time elapsed since a last back-up of the network attached storage, a parameter indicative of an amount of free space left on the network attached storage, and a parameter indicative of a status of at least one of backup data and backup equipment.

15. The computer-implemented method of claim 12, wherein the monitored plurality of operating parameters comprises at least one of a parameter indicative of a status of data redundancy at least on the network attached storage, a parameter indicative of a temperature of at least one drive in the network attached storage, and a parameter indicative of a state of at least one fan in the network attached storage.

16. The computer-implemented method of claim 12, wherein the indication comprises a number of a protection level, from among the predetermined plurality of protection levels, that is indicative of the determined protection level.

17. The computer-implemented method of claim 12, further comprising generating an alert according to the received selection at least when the current protection level is downgraded to a lower protection level.

18. The computer-implemented method of claim 17, wherein the alert comprises at least one of:
   at least one of a visual and an audible alert related to a current protection level on the network attached storage, and
   at least one of a visual and an audible alert related to a current protection level remote from the network attached storage.

19. The computer-implemented method of claim 17, further comprising sending, according to the received selection, the generated alert as at least one of an electronic message to a device, as an audible message, and via a window on a computer display.

20. The computer-implemented method of claim 12, further comprising determining the current protection level based on a weighting factor associated with at least one of the monitored plurality of operating parameters.

21. The computer-implemented method of claim 12, further comprising assigning a numerical score to the determined state of the network attached storage and determining the current protection level based on the assigned numerical score.

22. The computer-implemented method of claim 12, further comprising receiving user selection of a number of protection levels and determining the current protection level within the selected number of protection levels.

23. The computer-implemented method of claim 12, wherein monitoring the plurality of operating parameters of the network attached storage comprises polling at least one of:
   the at least one storage device;
   a network connection, and
   a remote storage coupled to the network.

* * * * *